United States Patent [19]
Ogasawara et al.

[11] 3,935,173
[45] Jan. 27, 1976

[54] CURABLE COMPOSITIONS
[75] Inventors: Takahisa Ogasawara; Yorimasa Kobayashi; Kiyokazu Mizutani; Teruo Nakagawa; Noboru Hisanaga; Hidemaro Tatemichi, all of Nagoya, Japan
[73] Assignee: Toagosei Chemical Industrial Co. Ltd., Tokyo, Japan
[22] Filed: Mar. 18, 1974
[21] Appl. No.: 452,266

[30] Foreign Application Priority Data
Mar. 22, 1973 Japan.............................. 48-32940

[52] U.S. Cl....... 260/78.5 E; 204/159.19; 260/37 R; 260/75 NT; 260/75 EP; 260/75 H; 260/75 UA; 260/76; 260/78.5 B; 260/89.5 A; 260/861; 260/872
[51] Int. Cl.$^2$ ................ C08F 220/20; C08F 222/12; C08G 63/52

[58] Field of Search... 260/76, 75 NT, 75 EP, 75 H, 260/75 R, 75 UA, 78.5 B, 78.5 E, 89.5 A, 872, 861

[56] References Cited
UNITED STATES PATENTS
| | | | |
|---|---|---|---|
| 3,218,305 | 11/1965 | Krieble | 260/89.5 |
| 3,551,311 | 12/1970 | Nass et al. | 204/159.18 |
| 3,631,154 | 12/1971 | Kawaguchi et al. | 260/76 |

Primary Examiner—John Kight, III
Attorney, Agent, or Firm—Frank J. Jordan

[57] ABSTRACT

A low viscous and solvent-free curable composition comprising a polyester type oligo(meth)acrylate having a plurality of (meth)acryloyl groups, and a polyol poly(meth)acrylate.

26 Claims, No Drawings

CURABLE COMPOSITIONS

This invention relates to a curable, solvent-free and liquid composition and more particularly it relates to a curable, solvent-free and liquid composition having a low content of volatile components and comprising both a polyester type oligo(meth)acrylate having a plurality of (meth)acryloyl groups and a polyol(meth)acrylate.

In this specification, the polyester type oligo(meth)acrylate and the polyol(meth)acrylate are hereinafter sometimes referred to as "component A" and "component B", respectively; the term "(meth)acryloyl group" means acryloyl and methacryloyl groups; "(meth)acrylate" means acrylate and methacrylate; and "(meth)acrylic acid" means acrylic and methacrylic acids.

A primary object of this invention is to provide a low viscous, solvent-free, curable and liquid composition which contains little or no low boiling volatile components causing environmenal pollution of a type of offensive odor, pungency and poisoning against human bodies, the liquid composition being rapidly and radically curable in the presence of a catalyst generating radicals thereby effecting polymerization thereof or by the application thereto of radiation or activating rays such as electron beam, $\gamma$-rays or ultraviolet rays.

Another object of this invention is to provide a curable composition which is easily curable even in the presence of a molecular oxygen-containing gas such as air thereby giving a cured product having a smooth surface.

The polyester type oligo(meth)acrylate (hereinafter referred to simply as "oligo(meth)acrylate") is obtained by the one-step or multi-step interesterification of a polyhydric alcohol, polycarboxylic acid and (meth)acrylic acid in the presence of a dehydration esterifying catalyst such as sulphuric acid. Certain of such oligo(meth)acrylates are, per se, known and processes for the synthesis thereof are also known. It is further known that these known oligo(meth)acrylates intrinsically are hardly volatile and are capable of being cross-linked and cured by the use of a radically curing method and, therefore, they can be used as coating materials, molding materials or the like (See, for example, A. A. Berlin, "Polyester acrylates", Nauka, Moscow; Japanese Patent Gazette No. 23661/72; A. A. Berlin et al.; Plast Massy (RUSS) 1971 (2), 26-8 (C. A. 74 (24) 126088f); and A. A. Berlin et al., Vysokomolekulyarnye Soedinonya 1, 951-6 (1959) (C. A. 54, 16899 d).

These known oligo(meth)acrylates generally have a high viscosity whereby they are made inconvenient to use in many cases. For example, in cases where they are used as a coating material or molding material, they will be inconvenient to weigh out, transfer from one container to another, to compound with pigments, fillers and various additives, to coat on a substrate to be coated, and to pour into a mold. In some cases, they will be impossible to put to practical use since they are inconvenient to handle in such operations as above.

The known oligo(meth)acrylates, therefore, are diluted with a low boiling solvent to decrease the viscosity thereof, subjected to a coating operation or the like, thereafter freed from the solvent by evaporation and then cured; or they are diluted with a low boiling polymerizable monomer such as styrene, acrylonitrile or a (meth)acrylic acid alkyl ester to decrease the viscosity thereof thereby rendering them to be easily handled in the operations. However, the dilution or incorporation with such a low boiling solvent or monomer will generally decrease the oligo(meth)acrylates in curability and will consequently devaluate the advantages, such as non-volatility, dispensation with solvents, rapid cure, air curability and freedom from environmental pollution, which are intrinsically owned by the oligo(meth)acrylates.

Thus there have been sought such compositions as are low viscous, low volatile when in use, and rapidly perfectly curable by radical polymerization.

The oligo(meth)acrylate which is one (component A) of the components of the curable composition of this invention, is any one of the following reaction products (I), (II) and their modifications, which products and modifications have a molecular weight such that the average molecular wight per (meth)acryloyl group is not exceeding 1000.

(I) Reaction products

Prepared by the one-step or multi-step esterification of at least three members comprising a member selected from trihydric or higher alcohols and dihydric or higher alcohols containing a trihydric or higher alcohol, a member selected from dicarboxylic or higher carboxylic acids and a member selected from (meth)acrylic acids.

(II) Reaction products

Prepared by the one-step or multi-step esterification of at least three members comprising a member selected from dihydric or higher alcohols, a member selected from tricarboxylic or higher carboxylic acids and dicarboxylic or higher carboxylic acids containing tricarboxylic or higher carboxylic acids, and a member selected from (meth)acrylic acids. These products (I) and (II) may be modified with an isocyanate, epoxy compound, acid chloride or the like.

In fact, the reaction products (I) and (II), that is the component A, may be prepared by esterifying a polyhydric alcohol, a polycarboxylic acid or the anhydride thereof, said polyhydric alcohol and polycarboxylic acid being not a dihydric alcohol and dicarboxylic acid respectively at the same time, and a (meth)acrylic acid to produce an oligo(meth)acrylate having a (meth)acryloyl group equivalent of not more than 1000 which is, if desired, further reacted with a modifying compound such as an isocyanate, epoxy or acid chloride compound to produce a modified form of said oligo(meth)acrylate.

The structure of the oligo(meth)acrylates thus prepared are hardly clarified as yet. In naming the thus-prepared compounds and representing the structure thereof, said literature or publications all indicate such compounds as if they were each a single compound and generally indicate the compounds as those having an averaged structure inferred from the composition of the starting materials charged. According to the information obtained by the present inventors, the actually obtained products had a much more complicated structure than those inferred from the composition of the starting materials fed. This is substantiated by, for example, Reference example 1 described later. A product synthesized in this Reference example was fractionated by the use of a fractional sedimentation method to obtain fractions which were then analyzed to find acryloyl groups and the like therein. The results are shown in the following Table 1.

Table 1

| Fraction No. | Weight distribution (%) | Average[1] molecular weight [$M_n$] | Average No. of functional groups per molecule[2] | | |
|---|---|---|---|---|---|
| | | | A[3] | T[4] | $T_p$[5] |
| 1 | 9.0 | 3300 | 8.91 | 5.87 | 11.2 |
| 2 | 1.5 | 2740 | 7.95 | 4.93 | 8.79 |
| 3 | 4.8 | 2850 | 8.12 | 5.36 | 9.32 |
| 4 | 7.5 | 2280 | 6.84 | 4.01 | 7.46 |
| 5 | 8.4 | 1890 | 6.58 | 3.52 | 6.69 |
| 6 | 11.1 | 1780 | 5.98 | 3.36 | 5.20 |
| 7 | 5.9 | 1420 | 4.33 | 2.90 | 4.73 |
| 8 | 7.4 | 1230 | 3.76 | 2.29 | 4.38 |
| 9 | 7.8 | 1030 | 3.83 | 1.81 | 3.33 |
| 10 | 4.6 | 893 | 3.66 | 1.61 | 2.85 |
| 11 | 4.9 | 726 | 3.27 | 1.06 | 2.36 |
| 12 | 11.4 | 450 | 2.19 | 0.53 | 1.65 |
| 13 | 6.8 | 400 | 2.20 | 0.41 | 1.42 |
| 14 | 5.0 | 340 | 2.50 | 0.20 | 1.11 |
| Loss | 3.9 | — | — | — | — |
| Total | 100.0 | — | — | — | — |

[1] Measured by Vapor pressure osmometry
[2] Values calculated from average molecular weight and functional group concentrations found by nuclear magnetic resonance and elemental analysis
[3] Acryloyl group: $CH_2=CH-CO-$
[4] Tetrahydrophthalic acid residue: $-OC-\underset{\bigcirc}{\phantom{x}}-CO-$
[5] Trimethylolpropane residue: $C_2H_5-C+CH_2-O\!\!\rightarrow_{3}$ The average number of (meth)acryloyl groups, molecular weight and (meth)acryloyl group concentrations in the molecule, can widely be varied by selecting the kind of starting materials used, the feed ratio between these starting materials, synthesizing process used and the like.

The number of (meth)acryloyl groups contained in the oligo(meth)acrylate molecule (the molecule being deemed to have a structure which is stoichiometrically inferable and this applying throughout the specification) varies depending upon the kind of starting materials used. The oligo(meth)acrylates prepared from a dihydric alcohol, dicarboxylic acid and (meth)acrylic acid have up to two (meth)acryloyl groups in the molecule. These oligodi(meth)acrylates as compared with oligo(meth)acrylates having more than two (meth)acryloyl groups, generally have a low viscosity but cannot rapidly be cured. They after cured will generally be inferior in hardness because of their low crosslinking density. In addition, if they are incorporated with the poly(methy)acrylate of a polyhydric alcohol (this poly(meth)acrylate being the other component B according to this invention), they will tend to decrease in curing rate or velocity. Thus the oligo(meth)acrylates which may be used in the invention should contain more than two (meth)acryloyl groups in the molecule.

In order to introduce more than two (meth)acryloyl groups in the molecule, it is necessary that part or the whole of polyhydric alcohols used as one of the starting materials should be trihydric or higher alcohols and/or that part or the whole of polycarboxylic acids should be tricarboxylic or higher carboxylic acids.

Since the use, as the component A, of an oligo(meth)acrylate containing (meth)acryloyl groups in unduly low concentrations will not give a desired final cruable composition capable of curing satisfactorily rapidly, an oligo(meth)acrylate which may be used in this invention should be such that its "(meth)acryloyl group equivalent" is not more than 1000, preferably 600. The lowest value of the meth)acryloyl group equivalent is necessarily determined depending on the kinds of a polyhydric alcohol and polycarboxylic acid, and it is desirable that said value is at least 120, preferably at least 150 to attain the object of this invention. The (meth)acryloyl group equivalent is a mean value obtained by stoichiometric calculation based on the composition of starting materials for the oligo(meth)acrylate and it can be adjusted by varying the composition (kinds and proportions of starting materials fed). The term "(meth)acryloyl group equivalent" used in this specification means a numeral value obtained by dividing the molecular weight of an oligo(meth)acrylate anticipated from the composition of starting materials for the oligo(meth)acrylate, by the number of (meth)acryloyl groups contained in this oligomer. The aforesaid numeral value, that is (meth)acryloyl group equivalent is expediently determined by the following formula $$\text{(Meth)acryloyl group equivalent} = \frac{W_G + W_{PA} + W_{MA} - W_{H_2O}}{M_A}$$

wherein $W_G$, $W_{PA}$ and $W_{MA}$ represent the weights (gram) of reacted polyhydric alcohol, polycarboxylic acid (or anhydride) and (meth)acrylic acid, respectively, $W_{H_2O}$ is the weight of water produced by esterification and determined by stoichiometric calculation, and $M_A$ represents the gram mol number of (meth)acrylic acid charged.

The oligo(meth)acrylate according to this invention is obtained by the one-step esterification of a composition containing said three kinds of components or starting materials in the presence of a dehydration esterifying catalyst such as sulphuric acid and, if necessary, with addition of a solvent to the interesterifying system; or it is obtained by the multi-step esterification comprising, for example, firstly esterifying (meth)acrylic acid with a polyhydric alcohol and secondly esterifying the thus-obtained ester with a polybasic acid or comprising firstly esterifying a polybasic acid with a polyhydric alcohol and secondly esterifying the thus-obtained ester with (meth)acrylic acid.

In the synthesis of the oligo(meth)acrylate having a (meth)acryloyl group equivalent of not more than 1000, the proportions of the three kinds of starting materials fed should be such that supposing the polyhydric alcohol and polycarboxylic acid used are respectively a NG-hydric alcohol and NA-carboxylic acid, the amount of the polycarboxylic acid charged may preferably be at least $$\frac{1}{NA\,(NG-1)} \text{ mol per mol}$$

of acrylic acid charged. "NG" and "NA" mean di, tri, tetra or the like. The proportions should most generally be such that the hydroxyl group equivalent in the polyhydric alcohol is equal to the carboxyl group equivalent in the polybasic acid and (meth)acrylic acid and, in some cases, the synthesis or esterification may also be effected in cases where the carboxylic group or the hydroxyl group is used in excess. This excess may tolerably be up to 10% and, in some cases, up to about 30%. Such esterification under the condition that one of the groups is in excess, is very often effected, for example, 1. in a case where (meth)acrylic acid, a lower polyhydric alcohol and the like, which are each a low boiling compound, is incorporated in such excess as to correspond with the amount of components which will run out of the system during the esterification, 2. in a case where is produced oligo(meth)acrylate leaving therein some carboxyl and hydroxyl groups which will be useful in obtaining an improved adhesiveness, chemical resistance and water resistance on the resulting final composition in the cured form, 3. in a case where these functional groups are needed to react with isocyanates, epoxy compounds, acid chlorides or other compounds thereby to give a final curable composition in the modified form.

The compounds which may be used for modifying the oligo(meth)acrylates, include isocyanate compounds such as butyl isocyanate, phenyl isocyanate, tolylene diisocyanate, hexamethylene diisocyanate, lysine diisocyanate, naphthalene diisocyanate, diphenylmethane diisocyanate, tolylene diisocyanate dimer, and trimethylolpropane adduct of tolylene diisocyanate; epoxy compounds or epoxy prepolymers such as ethylene oxide, propylene oxide, epichlorohydrin, phenylglycidyl ether, allylglycidyl ether, glycidyl(meth)acrylate, bisphenol A-diglycidyl ether, bisphenol A-dioxyethyl ether diglycidyl ether, polyethylene glycol diglycidyl ether and glycerine diglycidyl ether; and acid chlorides such as acetic acid chloride, propionic acid chloride, butyric acid chloride and benzoic acid chloride.

The reaction of these modifying compounds with the hydroxyl or carboxyl groups remaining in the oligo(meth)acrylate may be carried out by the use of known reaction processes and catalysts.

The oligo(meth)acrylates with excess carboxyl or hydroxyl groups remaining therein, and their modifications as mentioned above, may be used as the component A according to this invention.

The starting materials for synthesizing the oligo(meth)acrylates according to this invention are illustrated below.

ACRYLIC COMPOUNDS (Meth)acrylic acids, per se, may of course be used; and (meth)acrylic acid derivatives, such as lower alkyl esters of (meth)acrylic acid and halides of (meth)acrylic acid, which are capable of causing an esterifying reaction through interesterifying and addition reactions, may also be used as an equivalent compound to (meth)acrylic acid. Thus in this specification, said derivatives are intended to be included in the expression "(meth)acrylic acid".

POLYHYDRIC ALCOHOLS

Polyhydric alcohols which may be used are aliphatic, alicyclic, aromatic and araliphatic ones as well as polyhydric alcohols containing in the molecule an ethereal structure such as that obtained by dehydration condensing at least one kind of said polyhydric alcohols. They include the following.

[Dihydric alcohols]

Ethylene glycol, propylene glycol, butanedio(1,3-1,4- or 2,3-), pentamethylene glycol, hexamethylene glycol, heptamethylene glycol, octamethylene glycol, nonamethylene glycol, decamethylene glycol, neopentyl glycol, hydrogenated bisphenol A, cyclohexane-1,4-dimethanol, m-xylidene glycol, diethanolamine, dibromoneopentyl glycol, polybutadienediol, 1,4-cyclohexanediol, chloropropylene glycol, 3-methylpentanediol, 2,2-diethylpropanediol, 2-ethyl-1,4-butanediol, 2,2-diethylbutanediol-1,3, 4,5-nonandiol, 2-ethylhexanediol (-1,3 or -1,6), diethylene glycol, triethylene glycol, polyethylene glycol, dipropylene glycol, polypropylene glycol, bisphenol A dioxyethyl ether, bisphenol A dioxypropyl ether, diglycol, and 2,2-dihydroxybistrimethylene glycol.

[Trihydric and higher alcohols]

Glycerine, trimethylolmethane, trimethylolethane, trimethylolpropane, 1,2,6-hexanetriol, xylitol, trimethanolamine, triethanolamine, dulcitol; mannitol, pentaerithritol, sorbitol, erithritol, arabitol; glycerine mono-, di- or tri-polyethyleneglycol ether, and glycerine mono-, di- or tri-polypropyleneglycol ether. In addition, there may also be used polysiloxane polyhydric alcohols such as siloxane (3-hydroxy-2,2'-dimethylpropyl) ether and polysiloxane di(2-hydroxyethyl) ether (said polysiloxane polyhydric alcohols are disclosed in British Pat. No. 1145096 and other reports). For example, polysiloxane type polyhydric alcohols produced by the reaction of a polyisocyanate and said polyhydric alcohol as shown below, may also be used.

$(n+1)R(OH)_2 + nR'(NCO)_2 \rightarrow HO\text{---}$
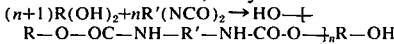

The epoxy groups of epoxy compounds are cleavage reacted with carboxyl groups to give the corresponding ester compounds similar to those which would be produced by reacting with a polyhydric alcohol. Thus the epoxy compounds may be used in substitution for polyhydric alcohols and, therefore, they are intended to be included in the expression "polyhydric alcohols" in this specification. The epoxy compounds which may be substituted for dihydric alcohols, include monoepoxides such as ethylene oxide, propylene oxide, epichlorohydrin, methylepichlorohydrin, allylglycidyl ether, and 3-hydroxypropylene oxide. Diepoxy prepolymers which may be used in substitution for tetrahydric alcohols, include glycerine di(meta)glycidyl ether, polyethylene glycol di(meta)glycidyl ether, polypropylene glycol di(meta)glycidyl ether, and di(meta)glycidyl ether of bisphenol A dioxypolyethylene glycol ether. In addition, triepoxy prepolymers such as glycerine tri(meta)glycidyl ether, may be used in place of hexahydric alcohols.

Polycarboxylic acids which may be used, are as follows.

[Dicarboxylic acids]

Phthalic, isophthalic, terephthalic, tetrahydrophthalic, hexahydrophthalic, Himic, Endo, tetrachlorophthalic, tetrabromophthalic, Het, methylhexahydrophthalic, polybutadienecarboxylic, oxalic, malonic, succinic, glutaric, adipic, sebacic, dodecanedioic, maleic, fumaric, itaconic, trimethyladipic, methyleneglutaric, ethylmalonic, acetylenedicarboxylic, methylmaleic, methylfumaric, thiodiglycolic, thiodivalerianic, sulfonyldiacetic, sulfonyldivalerianic, 1,4,5,6,7,7-hexabromo-endo-5-norbornene-2,3-dicarboxylic, 2,4-benzophenonedicarboxylic, bisphenol A diacetic, resorcinolacetic, trans-1,4-cyclohexenedicarboxylic, 1,3- (or 1,4-) tetrahydrophthalic, 1,3- (or 1,4)-hexahydrophthalic, α-methylitaconic, α,α-dimethylitaconic, α-ketoglutaric, 2,2- (or 2,3-) dimethylsuccinic, 2-methylsuccinic, hexylsuccinic, pimelic, suberic, azelaic, 3,3- (or 2,2-) dimethylglutaric, 3,3- (or 2,2-) diethylglutaric, 1,1-cyclobutanedicarboxylic, diglycolic, malic, cyclopentanedicarboxylic, dihydrophthalic, cyclohexanedicarboxylic, α-methylglutaric, and halogenated tetrahydrophthalic acids.

[Tricarboxylic and higher carboxylic acids]

Trimellitic, methylcyclohexenetricarboxylic, aconitic, butanetricarboxylic, tris(2-carboxyethyl) isocyanurate, naphthalenepolycarboxylic, bicyclooctenetetracarboxylic, pyromellitic, butanetetracarboxylic and benzoltetracarboxylic acids.

In addition, the anhydrides, acylhalides and the like of the aforesaid polycarboxylic acids are capable of reaction in the same manner as the polycarboxylic acids and may therefore be used in this invention. Accordingly, such derivatives of the polycarboxylic acids are intended to be included in the expression "polycarboxylic acids" in this specification. Furthermore, for example, polyamide type polycarboxylic acids which are produced by the reaction of the aforesaid polycarboxylic acid with a polyamine or polyisocyanate as shown in the following reaction formula:

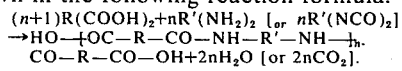
→HO—⫶OC—R—CO—NH—R'—NH—⫶ₙ.
CO—R—CO—OH+2nH₂O [or 2nCO₂].

Several examples of oligo(meth)acrylate which may be used in the preparation of the curable compositions of this invention are indicated below. It is to be understood that since the true structures of the oligo(meth)acrylates are very complicated and therefore difficult to determine correctly in each case as previously mentioned, the chemical names of particular oligo(meth)acrylates are substituted by general expressions which are inferred from starting materials used in the preparation of said particular oligo(meth)acrylates.

Poly(meth)acrylate of polyesterpolyol of tetrahydrophthalic acid and trimethylolpropane; poly(mesh)acrylate of polyesterpolyol of tetrahydrophthalic acid and glycerine; poly(meth)acrylate of polyesterpolyol of tetrahydrophthalic acid, pentaerithritol and ethylene glycol; poly(meth)acrylate of polyesterpolyol of tetrahydrophthalic acid, pentaerithritol and diethylene glycol; poly(meth)acrylate of polyesterpolyol of Het acid and trimethylolethane; and poly(meth)acrylate of polyesterpolyol of 6-methylcyclohexene-1,2,3-tricarboxylic acid and ethylene glycol.

The polyolpoly(meth)acrylates which are "component B" of the curable composition of this invention, when mixed with the oligo(meth)acrylate, will be effective in decreasing the oligo(meth)acrylate in viscosity thereby rendering it inconvenient to handle during its use, improving the resulting curable composition in curing rate or velocity and reforming the properties of a cured product to be obtained from the curable composition. They are usually synthesized by the esterification of (meth)acrylic acid and the polyhydric alcohol, which are previously mentioned to be usable as the starting materials for the oligo(meth)acrylate.

The suitable polyolpoly(meth)acrylates include di(meth)acrylates of alkanediol, such as ethylene glycol di(meth)acrylate, propylene glycol di(meth)acrylate, 1,3-butanediol di(meth)acrylate and 1,4-butanediol di(meth)acrylate; polyalkylene glycol di(meth)acrylates such as diethylene glycol di(meth)acrylate, triethylene glycol di(meth)acrylate, tetraethylene glycol di(meth)acrylate and dipropylene glycol di(meth)acrylate; tri(meth)acrylates of alkanetriols, such as glycerine tri(meth)acrylate, trimethylolmethane tri(meth)acrylate, trimethylolethane tri(meth)acrylate, trimethylolpropane tri(meth)acrylate and 1,2,6-hexanetriol tri(meth)acrylate; pentaerithritol tetra(meth)acrylate and erithritol tetra(meth)acrylate. In addition to these compounds, there may also be used such products that are obtained by reacting (meth)acrylate with an epoxy prepolymer such as bisphenol A diglycidyl ether or glycerine diglycidyl ether each having a structure of polyolpoly(meth)acrylate. Among the polyolpoly(meth)acrylates, said alkanetriol tri(meth)acrylates are the most suitable for the object of this invention since they can cure at a great rate and have a low viscosity as compared with the others.

The oligo(meth)acrylate and polyolpoly(meth)acrylate from which the curable composition of this invention is prepared, are as detailed and illustrated above. In the preparation of the curable composition, the oligo(meth)acrylate may be used in amounts of preferably 10–99%, more preferably 20–99% and most preferably 30–99% by weight of the total of the oligo(meth)acrylate and polyolpoly(meth)acrylate.

The curable composition of this invention, as is described later, may be radically crosslinked and cured by various curing means, but it is generally subject to a polymerization-inhibiting action of the oxygen present in the air in the same manner as in the polymerization of ordinary vinyl monomers. The polymerization-inhibiting action of the oxygen varies depending on the kind of the oligo(meth)acrylate, curing means, atmospheric temperature, composition of catalyst and the like, each used in the polymerization, and the curable composition of this invention will easily be curved even in the air to form a cured body having a smooth surface since the polymerization-inhibiting action of the air is slight if it has the following composition and is attempted to be cured in the following cases:

1. A case where the curable composition is attempted to be cured at temperatures of as high as 120°C or higher.
2. A case where the curable composition contains the acryloyl groups in amounts of not less than 50 mol% of the total of the acryloyl and methacryloyl groups contained therein, and the curing is effected under the action of ultraviolet rays.
3. A case where the curable composition is one which is prepared from, as one of the starting materials, an oligo(meth)acrylate obtained from a 4,5-unsaturated polycarboxylic acid, such as tetrahydrophthalic, Het, Himic and 6-methylcyclohexene-1,2,3-tricarboxylic acids, as the polycarboxylic acid source for the oligo(meth)acrylate, and the curable composition contains acryloyl groups in amounts of not less than 50 mol % of the total of the acryloyl and methacryloyl groups contained therein. Het acid is "1,4,5,6,7,7-hexachloro-endo-5-norbornene-2,3-dicarboxylic acid" or "1,4,5,6,7,7-hexabromo-endo-5-norbornene-2,3-dicarboxylic acid", and Himic acid is "endo-5-norbornene-2,3-dicarboxylic acid".

If the curable composition which is subject to the polymerization-inhibiting action of the oxygen in the air is to be cured or the curing is to be effected by a curing means which is subject to such inhibiting action, the curing should preferably be effected in the atmosphere of an inert gas such as nitrogen or carbonic acid gas or after covering the surface of a substrate with a thin plastic film or the like to prevent the air from contacting the surface.

The curable compositions of this invention may be cured by any one of known radically curing methods. The curing may be effected not only at ambient temperatures but also by the application of various energy such as thermal energy given by induction heating, microwave heating, infra-red ray heating or the like or by radiation energy given by ultraviolet rays, visible rays, electron beams, γ rays or the like.

In effecting the curing at ambient temperatures or by the application of mainly heat energy given by a heating furnace, induction heating, microwave heating, infra-red ray heating or the like, there may be used as a radical polymerization catalyst, alkyl peroxides, peracid esters and other organic peroxides as well as inorganic peroxides and azo compounds as indicated in, for example, "Practical catalysts for particular reactions" p. 764 (1970) published by Kagaku Kogyo Co. In carrying out the curing at relatively low temperatures, the use of the radical polymerization catalyst in combination with a tertiary amine or metal salt as an accelerating agent will advantageously ensure a shorter curing time. Examples of such combinations are a combination of an acyl peroxide with a tertiary amine, a combination of a peracid ester with a metal salt, a combination of a hydroperoxide and a metal salt and a combination of a ketone peroxide with a metal salt.

It is not always necessary to use such polymerization initiator in effecting the curing when the energy source used for the curing is an ionizing radiation such as electron beams or γ rays since the energy permits the curing to proceed to a satisfactory extent without the polymerization initiator, while it is preferable to use a polymerization initiator which will produce radicals and initiate the polymerization by the absorption of radiation when there is used such radiation as ultraviolet or visible rays. Photoinitiators may be used.

The initiators which may be used include those described in, for example, G. Oster and N. Yang, "Chemical Reviews", 68-2, 125 (1968), Yasunori Nishijima and Masao Yamamoto, "Kogyo Kagaku Zasshi (Journal of Industrial Chemistry)" 72, 31 (1969), U.S. Pat. Nos. 3,551,235, 3,551,246 and Japanese Patent Gazette No. 19,042/71. Examples of the suitable initiators are carbonyl compounds such as benzoin, benzoin methyl ether, benzoin ethyl ether, benzoin isopropyl ether, benzoin butyl ether, benzoin octyl ether, α-methylbenzoin, α-phenyl benzoin, benzil, diacetyl, methyl anthraquinone, acetophenone and benzophenone; sulphur compounds such as diphenyl sulphide, diphenyl disulphide and dithiocarbamate; naphthalene-anthracene type compounds such as α-chloronaphthalene and anthracene; halides such as dimethyl tetrachlorophthalate and hexachlorobutadiene; metal salts such as uranyl nitrate, iron chlorides and silver chloride; and pigments such as acriflavine and fluorescein. These radical polymerization catalysts, accelerating agents or initiators may preferably be used in amounts of 0.001–10%, more preferably 0.01–5%, by weight of the curable composition. It is effective to incorporate the curable composition with small amounts of a suitable stabilizing agent in order to prevent the composition from gelling during its storage and increase it in storage stability.

The stabilizers used herein include phenolic compounds such as hydroquinone, t.-butyl hydroquinone, catechol and t.-butyl catechol; quinones such as benzoquinone and diphenylbenzoquinone; and phenothiazine and copper salts.

These stabilizers may preferably be used in amounts of 0.0001–3% by weight of the curable composition. In order to obtain cured products having improved properties from the curable composition of this invention or depending on the purpose for which the cured products are used, various additives may be incorporated in the curable composition in amounts of up to 70%, preferably up to 50%, by weight of the curable composition to form a uniform solution thereof or to form a nonuniform mixture.

The various additives used herein include synthetic and natural polymers, copolymers and rubber, such as unsaturated polyesters, alkyd resins, polyethylene, polypropylene, polystyrene, poly(meth)acrylate, polyvinyl chloride, polybutadiene and cellulose; prepolymers and oligomers such as diallyl phthalate prepolymer and butadiene oligomers; plasticizers such as dioctyl phthalate and soyabean oil; oils and fats; tackifiers; pigments and inorganic fillers such as glass, titanium oxide, silica, barite and calcium carbonate; coloring matter such as dyestuffs; and stabilizers and anticorrosive agents to obtain increased weather and water resistances on a cured product to be produced from the curable composition.

In addition, for the purpose of, for example, adjusting the viscosity of the curable composition or obtaining improved properties on a cured product to be prepared from the composition, other additives may also be added to the curable composition. These other additives include epoxy prepolymers such as bisphenol A diglycidyl ether and glycerine diglycidyl ether; mono- and polyisocyanates; mono- and poly(meth)acrylamide as prepared by reacting said isocyanates with (meth)acrylic acid; polymerizable monomers such as alkyl (meth)acrylates, tetrahydrofurfuryl (meth)acrylate, 2-hydroxyethyl (meth)acrylate, styrene, acrylonitrile and allyl glycidyl ether; and various solvents.

The curable compositions of this invention hardly have volatile components, poisonousness and pungency and they can be cured rapidly and perfectly by the application thereto of various energy such as radiation in the atmosphere of an inert gas thereby excluding the air or in the air or other various atmospheres, and the cured product so obtained is tough and excellent in heat resistance since it is of a crosslinked type. The curable compositions are further advantageous in that when applied to substrates such as various metals, plastics, lumber, paper or the like, they will give cured products excellently bonded to the substrates, respectively.

Because of these advantages, the curable compositions of this invention have a wide use as coating materials and surface treating agents for metals, plastics, glass, lumber, paper, fibers, rubber and the like; relief plates for printing, vehicles for printing inks and binders; and materials for castings, materials for molds for castings, materials for laminates, materials for composites with plastics, molding materials and the like.

The following Reference examples 1–3 indicate the synthesis of oligo(meth)acrylates used in Examples to be described later. In each Example, the starting materials charged were substantially perfectly reacted together.

REFERENCE EXAMPLE 1

(Synthesis of polyacrylate of polyesterpolyol of tetrahydrophthalic acid and trimethylolpropane)

A reactor provided with an agitator, thermometer and water separator was charged with 76 g (0.5 mol) of tetrahydrophthalic anhydride, 134 g (1 mol) of trimethylolpropane, 144 g (2 mol) of acrylic acid, 1000 cc of toluene, 98% sulphuric acid in the amount of 2.5% by weight of the total mass excluding the toluene, and phenothiazine in the amount of 0.08% by weight of the acrylic acid, to form a mixture. The resulting mixture was agitated at about 110°C while removing water produced by esterification from the system as an azeotropic mixture with the toluene. Eight hours later, approximately the theoretical amount of water was found to have been removed, the esterifying reaction was terminated and the reaction mixture was cooled. The reaction mixture was washed with 600 cc of an aqueous solution containing 3% by weight of ammonia and 20% by weight of ammonium sulphate and then with an aqueous solution containing 20% by weight of ammonium sulphate, after which the toluene layer was incorporated with 0.05 g of hydroquinone and distilled at about 50°C under a reduced pressure of 6 mm Hg to cut the toluene. The oligoacrylate thus obtained as the bottoms was a yellow-colored, viscous liquid containing 1.8% by weight of toluene and having a viscosity of 54000 centipoise (at 21°C) and an acryloyl group equivalent of 155. The prevailing or general structure of the oligoacrylate anticipated from the composition of the starting materials is as follows:

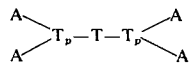

wherein A, $T_p$ and T represent $CH_2=CH-CO-$,

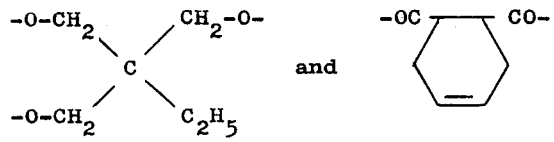

respectively.

REFERENCE EXAMPLE 2

(Synthesis of polyacrylate of polyesterpolyol of tetrahydrophthalic acid and pentaerithritol)

The procedure of Reference example 1 was followed except that the trimethylolpropane and acrylic acid were substituted by 136 g (1 mol) of pentaerithritol and 216 g (3 mol) of acrylic acid, to obtain an oligoacrylate. The thus-obtained oligoacrylate was a yellow-colored, viscous liquid containing 3.8% by weight of toluene and having a viscosity of 26250 cps (at 25°C) and an acryloyl group equivalent of 122. The prevailing structure of the oligoacrylate is considered as follows:

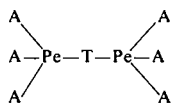

wherein Pe represents

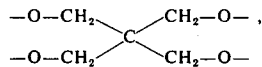

and A and T are as defined as above.

REFERENCE EXAMPLE 3

(Synthesis of polyacrylate of polyester polyol of tetrahydrophthalic acid, diethylene glycol and pentaerithritol)

The same reactor as used in Reference example 1 was charged with 53 g (0.5 mol) of diethylene glycol, 152 g (1 mol) of tetrahydrophthalic anhydride and 0.2 g of trimethylbenzylammonium chloride to form a mixture which was then heated to about 100°C for three hours. The mixture so heated was incorporated with 136 g (1 mol) of pentaerithritol, 216 g (3 mol) of acrylic acid, 1500 cc of toluene, 14 g of sulphuric acid and 0.2 g of phenothiazine, and the whole mass was subjected to the same reaction as in Reference example 1 to produce an oligoacrylate. The oligoacrylate so produced was a light brown-colored, viscous liquid which contained 0.9% by weight of toluene and had a viscosity of 90000 cps (21°C) and an acryloyl group equivalent of 162. The prevailing structure of the oligoacrylate is considered as follows:

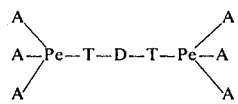

wherein A, T and Pe are as defined as above, and D represents $-O-(CH_2-CH_2-O)_2-$.

EXAMPLE 1

Fifty parts by weight of the oligoacrylate obtained in Reference example 2, 50 parts by weight of trimethylolpropane triacrylate and one part of benzoyl peroxide were together mixed to form a mixture which was then coated on a cold rolled steel plate (degreased with trichloroethylene, JIS-G-3141, stain-finish, Bt 144 treatment) to a thickness of about 30 μ by the use of a bar coater. The coat thus formed on the steel plate was placed 17 cm below a far infra-red panel heater (D type panel heater, 2 KW, produced by the Kokusai Denki Co., Ltd.) and then thermally cured by the application of infra-red rays thereto in the air for 5 minutes.

For comparison, following the aforesaid procedure, but substituting the trimethylolpropane triacrylate by 50 parts by weight of styrene, coating and curing were carried out (Comparative example 1).

The results are shown in the following table.

| | Volatilization* loss | Pencil hardness | Appearance of coat |
|---|---|---|---|
| Example 1 | 6.3% | 4H | Colorless, transparent and smooth. |
| Comparison example 1 | 38.3% | 3H | Whitened. Large pin holes formed. |

*Decrease in weight of the coat during the time from the end of coating to the end of curing.

EXAMPLE 2

Sixty parts by weight of the oligoacrylate obtained in Reference example 3 and 40 parts by weight of trimethylolpropane triacrylate were mixed together and the resulting mixture was then applied to a cold rolled steel plate (the same as used in Example 1) to a thickness of about 25 μ by the use of a bar coater. The coat thus formed on the plate was then cured by the irradiation of electron beams of 5 megarads at a current of 10 mA by the use of an electron beam accelerator in the air.

For comparison, coating and curing were conducted in the same manner as above with the exception that the trimethylolpropane triacrylate was substituted by 40 parts by weight of styrene (Comparative example). The results are indicated in the following table.

|  | Volatilization* loss | Pencil hardness | Appearance of coat |
|---|---|---|---|
| Example 2 | 2.1% | 4H | Colorless, transparent and smooth. |
| Comparative example 2 | 23.6% | 3H | Ditto |

*The same as in Example 1.

EXAMPLE 3–10

One of the oligoacrylates obtained in Reference examples 1 and 3 was mixed, in the predetermined ratios as shown in the following table, with a polyol(meth)acrylate selected from trimethylolpropane triacrylate (abbreviated to "A-TMP") trimethylolpropane trimethacrylate (TMP), 1,3-butanediol diacrylate (A-3BG), triethylene glycol diacrylate (A-3G) and triethylene glycol dimethacrylate (3G). The mixture so obtained was further incorporated with benzil and hexamethylenediamine in the amounts of 2 parts and 1 part by weight, respectively, per 100 parts by weight thereof to form a curable composition. Each of the curable compositions thus obtained was coated on a hard glass plate to a thickness of about 30 μ and then cured by the irradiation of ultraviolet rays thereto in the air at a distance of 13 cm from a high pressure mercury lamp for the ultraviolet rays (H-2000 TQ, double lamp). For comparison, the same procedure as above was followed with the exception that the polyol(meth)acrylate was replaced by styrene, to form a curable composition. Each of the comparative curable compositions thus obtained was tested in the same manner as above.

The results are shown in the following table.

pound selected from the group consisting of a polycarboxylic acid and the anhydride thereof, said polyhydric alcohol and polycarboxylic compound not being a dihydric alcohol and dicarboxylic compound respectively at the same time, and (3) (meth)acrylic acid to produce the oligo(meth)acrylate and (B) a polyol poly(meth)acrylate prepared by esterifying a polyhydric alcohol and (meth)acrylic acid to produce the polyol poly(meth)acrylate.

2. A curable composition according to claim 1, wherein the polycarboxylic compound is a member selected from the group consisting of (a) a 4,5-unsaturated alicyclic polycarboxylic acid, (b) an anhydride thereof, and (c) a mixture of said alicyclic polycarboxylic compound with a member selected from the group consisting of dicarboxylic and higher polycarboxylic acids and anhydrides thereof other than said alicyclic polycarboxylic compound.

3. A curable composition according to claim 2, wherein said oligo(meth)acrylate is reacted with a modifying compound selected from the group consisting of isocyanates, epoxy compounds and acid chlorides.

4. A curable composition according to claim 2, wherein the acryloyl groups are contained in amounts of 50–100 mol% of the total of the acryloyl and methacryloyl groups.

5. A curable composition according to claim 2, wherein the (meth)acryloyl group equivalent of the component A is not more than 600.

6. A curable composition according to claim 2, wherein the polyhydric alcohol used in the production of the oligo(meth)acrylate is a member selected from the group consisting of trihydric and higher polyhydric alcohols, and dihydric and higher polyhydric alcohols containing such trihydric and higher polyhydric alcohols.

7. A curable composition according to claim 6, wherein the trihydric and higher polyhydric alcohols are trihydric, tetrahydric and hexahydric alcohols.

8. A curable composition according to claim 6, wherein the trihydric and higher polyhydric alcohols

|  |  | Composition | | Viscosity (cp/25°C) | Ultraviolet rays irradiation time required to complete curing (sec.) | Volatilization loss (wt.%) | Pencil hardness of coat formed | Appearance of coat formed |
|---|---|---|---|---|---|---|---|---|
|  |  | Mixing ratio by weight Oligoacrylate/ Polyol(meth)acrylate | | | | | | |
| Example | 3 | Reference example 1/A-TMP | =60/40 | 5400 | 10 | 3.0 | 3H | Colorless, transparent and smooth |
| " | 4 | Reference example 3/A-TMP | =70/30 | 23000 | 8 | 2.1 | 3H | " |
| " | 5 | " | / " | =50/50 | 4800 | 10 | 2.3 | 3H | " |
| " | 6 | " | / " | =30/70 | 1300 | 10 | 2.3 | 3H | " |
| " | 7 | " | /A-BD | =50/50 | 200 | 15 | 3.7 | 2H | " |
| "8 | " | /A-3G | =50/50 | 320 | 15 | 3.5 | 2H | " |
| " | 9 | " | /3G | =50/50 | 250 | 25 | 3.5 | 2H | " |
| " | 10 | " | /TMP | =50/50 | 2300 | 25 | 2.4 | 3H | " |
| Comparative example 3 | | Reference example 1/styrene | =50/50 | 200 or less | 40 | 20.0 | 2H | Colorless with creases on surface |
| Comparative example 4 | | Reference example 3/styrene | =50/50 | 200 or less | 40 | 21.6 | 2H | " |

What is claimed is:

1. A curable composition comprising (A) an oligo(meth)acrylate having a (meth)acroyl group equivalent of not more than 1000 and being prepared by esterifying (1) a polyhydric alcohol, (2) a polycarboxylic comare trimethylolethane, trimethylolpropane, glycerine, 1,2,6-hexanetriol, pentaerithritol, erithritol and sorbitol.

9. A curable composition according to claim 2, wherein the polycarboxylic compound used in the production of the oligo(meth)acrylate is selected from the group consisting of 4,5-unsaturated alicyclic tricarboxylic and higher polycarboxylic acids, mixtures of these alicyclic polycarboxylic acids with dicarboxylic and higher polycarboxylic acids, and mixtures of 4,5-unsaturated alicyclic dicarboxylic acids with tricarboxylic and higher polycarboxylic acids.

10. A curable composition according to claim 9, wherein the tricarboxylic and higher polycarboxylic acids are tricarboxylic and tetracarboxylic acids.

11. A curable composition according to claim 2, wherein the 4,5-unsaturated alicyclic polycarboxylic acid is selected from the group consisting of tetrahydrophthalic acid, Himic acid and Het acid.

12. A curable composition according to claim 2, wherein the 4,5-unsaturated alicyclic polycarboxylic acid is 6-methyl-cyclohexene-4-1,2,3-tricarboxylic acid.

13. A curable composition according to claim 2, wherein the dicarboxylic and higher polycarboxylic acids other than the 4,5-unsaturated alicyclic polycarboxylic acid are phthalic, tetrachlorophthalic, tetrabromophthalic, hexahydrophthalic, malonic, succinic, maleic, fumaric, itaconic, glutaric, adipic, sebacic, 1,12-dodecanedioic, polybutadienedicarboxylic acid, trimellitic and pyromellitic acids.

14. A curable composition according to claim 2, wherein the polyhydric alcohol used in the production of the oligo(meth)acrylate is selected from the group consisting of ethylene glycol, diethylene glycol, propylene glycol, dipropylene glycol, polypropylene glycol, 1,3-butanediol, 1,6-hexanediol, neopentyl glycol, hydrogenated bisphenol A, bisphenol dioxyethyl ether, bisphenol dioxypropyl ether and polybutadienediol.

15. A curable composition according to claim 2, wherein the polyol poly(meth)acrylate is a member selected from the group consisting of tri(meth)acrylate and di(meth)acrylate of a trihydric alcohol selected from the group consisting of trimethylolmethane, trimethylolethane, trimethylolpropane and 1,2,6-hexanetriol and glycerine.

16. A curable composition according to claim 2, wherein the polyol poly(meth)acrylate is a di(meth)acrylate of a dihydric alcohol selected from the group consisting of ethanediol, 1,2-propanediol, 1,3-butanediol, 1,4-butanediol, neopentyl glycol, diethylene glycol, triethylene glycol, tetraethylene glycol, dipropylene glycol, polyethylene glycol, polypropylene glycol, hydrogenated bisphenol A, bisphenol dioxyethyl ether, bisphenol dioxypropyl ether and 1,6-hexanediol.

17. A curable composition according to claim 2, wherein the polyol poly(meth)acrylate is a member selected from the group consisting of tetra(meth)acrylate, tri(meth)acrylate and di(meth)acrylate of a member selected from the group consisting of pentaerithritol and erithritol.

18. A curable composition according to claim 2, wherein the oligo(meth)acrylate is contained in amounts of 10-99% by weight of the composition.

19. A curable composition according to claim 2, wherein the oligo(meth)arcylate is contained in amounts of 30-99% by weight of the composition.

20. A curable composition according to claim 2, containing a photoinitiator in amounts of 0.001-10% by weight thereof.

21. A curable composition according to claim 2, containing a photoinitiator in amounts of 0.01-5% by weight thereof.

22. A curable composition according to claim 2, containing with an organic peroxide in amounts of 0.001-10% by weight thereof.

23. A curable composition according to claim 2, containing with an organic peroxide in amounts of 0.01-5% by weight thereof.

24. A curable composition comprising an oligoacrylate having an acryloyl group equivalent of about 120-600 and being prepared by the esterification of trimethylolpropane, tetrahydrophthalic anhydride and acrylic acid, and trimethylolpropane triacrylate.

25. A curable composition comprising an oligoacrylate having an acryloyl group equivalent of about 120-600 and being prepared by the esterification of pentaerithritol, tetrahydrophthalic anhydride and acrylic acid, and trimethylolpropane triacrylate.

26. A curable composition comprising an oligoacrylate having an acryloyl group equivalent of about 120-600 and being prepared by the esterification of pentaerithritol, diethylene glycol, tetrahydrophthalic anhydride and acrylic acid, and trimethylolpropane triacrylate.

* * * * *